Figure 1:
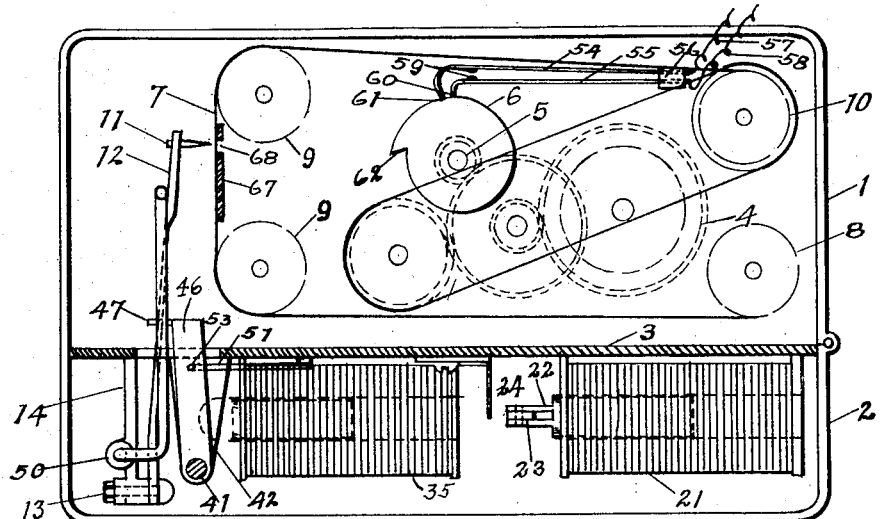

E. G. RALSTON.
SERVICE, DEMAND, OR OPERATION RECORDER.
APPLICATION FILED APR. 8, 1916.

1,218,955.

Patented Mar. 13, 1917.
2 SHEETS—SHEET 1.

WITNESSES:
J. W. Crawford
Chas. L. Hughes

INVENTOR.
E. G. RALSTON.
BY
J. A. Sperry
ATTORNEY.

E. G. RALSTON.
SERVICE, DEMAND, OR OPERATION RECORDER.
APPLICATION FILED APR. 8, 1916.
1,218,955.
Patented Mar. 13, 1917.
2 SHEETS—SHEET 2.
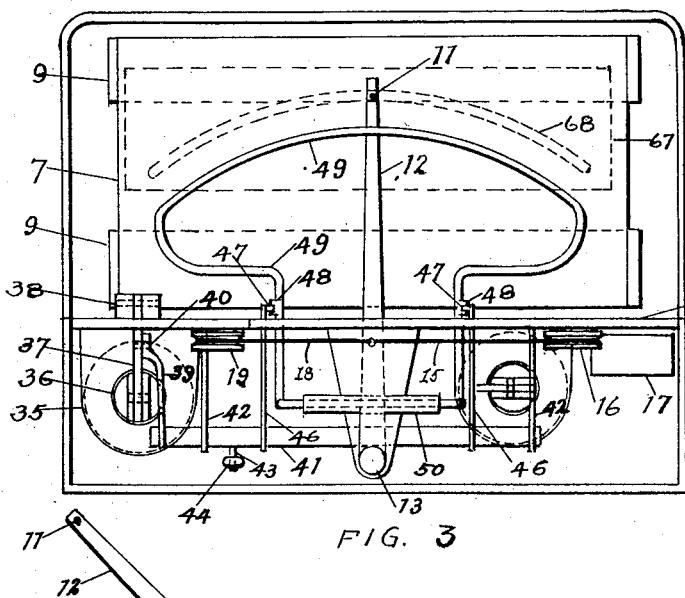
FIG. 3
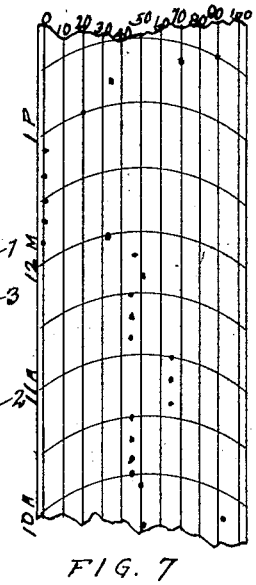
FIG. 7
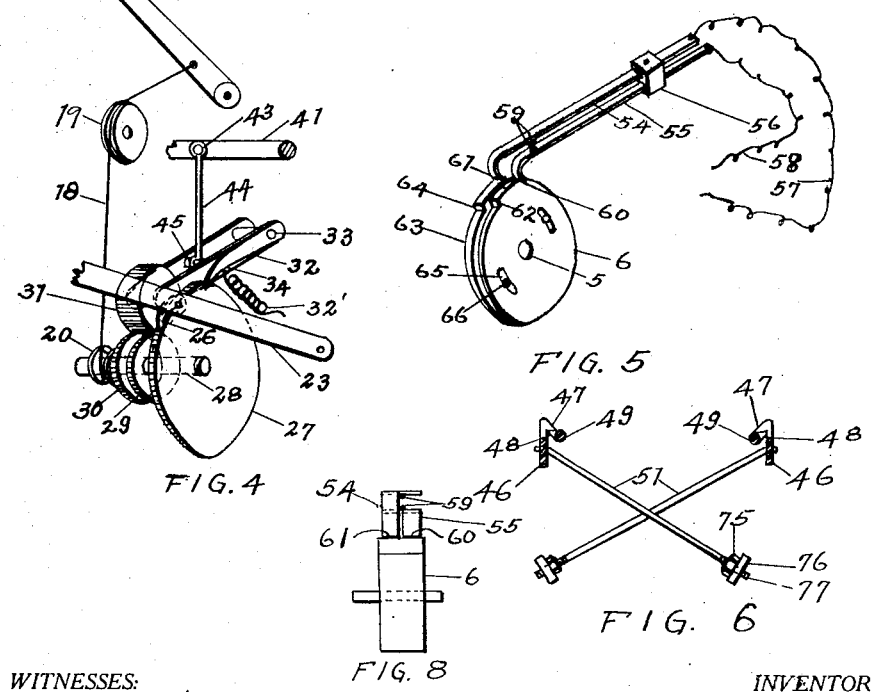
FIG. 4
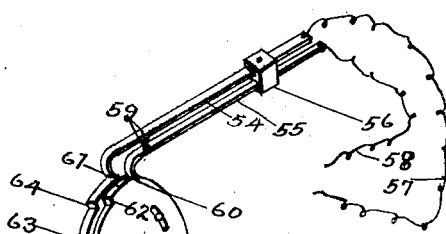
FIG. 5
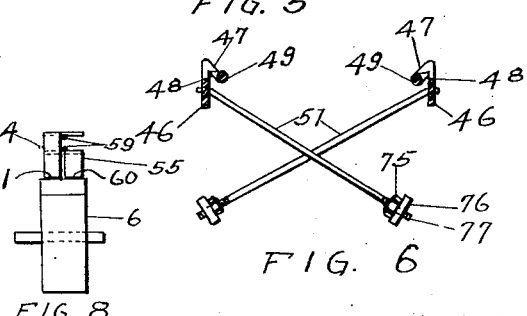
FIG. 8
FIG. 6
WITNESSES:
J. W. Crawford.
Chas. L. Hughes
INVENTOR.
E. G. RALSTON.
BY
J. A. Sperry
ATTORNEY.

UNITED STATES PATENT OFFICE.

EMMET GRATTAN RALSTON, OF INDIANAPOLIS, INDIANA.

SERVICE, DEMAND, OR OPERATION RECORDER.

1,218,955.

Specification of Letters Patent.

Patented Mar. 13, 1917.

Application filed April 8, 1916. Serial No. 89,987.

*To all whom it may concern:*

Be it known that I, EMMET G. RALSTON, a citizen of the United States, and a resident of the city of Indianapolis, county of Marion, and State of Indiana, have invented certain new and useful Improvements in Service, Demand, or Operation Recorders, of which the following is a specification.

My invention relates to improvements in service, demand or operation recorders of the electrically operated type, and has for its object the provision of an instrument which may be used in connection with any source of electrical energy for the permanent recording of service, operation or periodic demand of any reciprocating or rotating mechanism, such as printing presses, rolling mills, elevators, pumps, cash register sales, telephone calls, etc., and more particularly in connection with electrical installations for recording the maximum or periodic demand in connection with watt-hour meters and similar devices.

One object of my invention is to provide an apparatus which may be used in place of other forms of curve drawing instruments and which records in a simple, convenient and permanent form both the normal and abnormal demands and periodic variations of such demands made by an electrical installation upon its central station.

Another object is to provide a novel type of demand apparatus adapted to record the varying demands of any electric, rotating or reciprocating installation or mechanism in an accurate, permanent and easily distinguishable form.

Another object is to provide an instrument which shall make a permanent record of the rate and variation of rotation or reciprocation of any mechanism during successive equal periods of time.

Another object is to provide a record of such operation in the form of perforations or punctures of a record sheet by an automatically operated stylus or needle point.

Another object is to provide an instrument which shall make a permanent record at the expiration of successive predetermined equal periods of time of the total number of cycles of operation of a mechanism or the total amount of work performed within such period as indicated by the number of such cycles of operation.

Another object is the provision of an instrument that shall make a permanent, accurate and convenient record of the periodic, average and maximum demand of an electric installation as registered by a watt-hour meter.

Another object is to provide an instrument which shall be simple in character, easy of installation and adjustment, economical of manufacture, adapted to a wide range of application, accurate in its records and easy in the interpretation of such records.

In the carrying out of my invention I provide an apparatus for recording on a suitable moving record sheet the total amount of demand or the total cycles of operation of a mechanism which have occurred within predetermined equal periods of time. The record sheet preferably employed consists of a graduated strip of paper which is wound from one drum to another, the record on this sheet consisting of a perforation or puncture at the termination of each successive elapsed equal period of time. Abnormal demands will thus be indicated by the location of the record marking toward one side of the record sheet, while smaller demands will be recorded more approximately the other side of the sheet.

The construction and mode of operation of an apparatus embodying my invention in one of its preferred forms will be best understood from the following description taken in connection with the accompanying drawings in which:—

Figure 2:
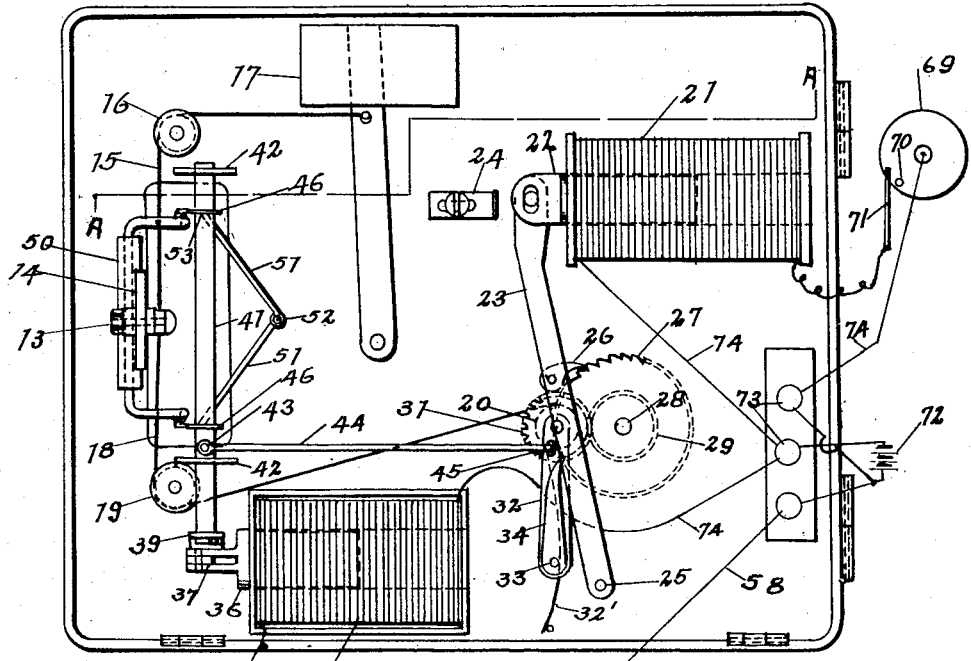

Figure 1 is a side elevation partly in section on line A—A of Fig. 2. Fig. 2 is a front elevation of the rear or operating side of the device. Fig. 3 is a top plan view with the upper portion of the case removed. Fig. 4 is a perspective view of the stylus actuating mechanism. Fig. 5 is a perspective view of an alternative arrangement of the electrical "make and break" contact used in connection with the clock mechanism. Fig. 6 is a detail partly in section of the instantaneous stylus release mechanism. Fig. 7 illustrates a fragment of a preferred form of the record sheet with a hypothetical record thereon. Fig. 8 is a detail showing narrowed points of "make and break" mechanism.

With more particular reference to the drawings the numeral 1 indicates the front portion of the case; 2 the rear portion; 3 a dividing wall to which the mechanisms may be readily attached for convenience of adjustment and manipulation. 4 indicates the clock work or driving mechanism in general, of which 5 is a shaft driven by said clock work at uniform rotative speed, and on which cam 6 is rigidly and electrically non-conductively mounted. 7 indicates the sheet on which the records are recorded, the sheet being wound from drum 8 over rollers 9 and rewound on drum 10. The stylus or needle point 11 carried by indicator arm 12 moves arcuately transverse the sheet, the arm 12 being vertically flexible to allow normal movement of the stylus 11, is pivoted at 13 on bracket 14, and is normally retained in its horizontally retracted or zero position by the cord 15 acting over sheave 16 under the influence of counterweight 17. Attached also to indicator 12 is cord 18 acting over sheave 19, the opposite end of cord 18 being attached to and wound on drum 20 to move the indicator and stylus forwardly from their retracted position.

The electric solenoid or magnet 21 through its core 22 is pivotally connected to lever 23 which is pivoted as at 25 and carries pawl 26 to co-act with the ratchet wheel 27 mounted on shaft 28 to drive the drum 20 through the fixed pinion 29, the loose pinion 30 and the broad-faced idler or connector pinion 31. Pinion 31 is carried on an arm 32 pivoted at 33 for a purpose to be hereinafter described. Pivot 33 also carries a suitable pawl 34 to prevent the retrograde rotation of ratchet wheel 27 during retrograde movement of pawl 26.

A second solenoid or magnet 35 is pivotally connected through its core 36 and lever 37 pivoted at 38 with a lever 39 by means of pin 40. Lever 39 is fixed to shaft 41 which is supported on bearings or brackets 42. Shaft 41 carries a short arm or pin 43 which is connected through link 44 to stud or pin 45 mounted on the arm 32, thus maintaining fixed relation of arm 32 and pinion 31 with shaft 41. Mounted also on shaft 41 are the spring arms 46, having at their extremities lips or projections 47 adapted to engage with similar lips or projections 48 rigidly connected to indicator depressing yoke 49 which is pivotally supported on bracket 14 through bearing 50. Pivotally connected to arms 46 near their forward ends are the toggle rods 51, having their opposite ends supported by a pin as at 52, or these ends may be adjustably supported on lugs 76 in connection with threads 77 and adjusting nuts 75.

Supported by a convenient insulating block 56 attached to the clock frame are the spring contact members 54 and 55 in superposed relation having connected thereto electric current carrying wires 57 and 58 respectively. Approximately at the other extremity of these members are the electric contact points 59 which are normally separated to prevent the passage of current therethrough. The arms 54 and 55 ride in contact with the cam member 6 at the points 61 and 60 respectively and are so adjusted that one precedes the other by a definitely fixed or adjustable distance, so that as the cam 6 revolves with shaft 5 the point 61 will pass over the depression 62 in advance of point 60, when the resiliency of arm 55 will cause the contact points 59 to come in conjunction with one another for a predetermined interval of time until point 60 passes over depression, again causing separation of said points.

Cam 6 may be of a single piece of insulating material or it may be preferably of two adjustably related pieces as shown in the alternative construction of Fig. 5 in which 63 indicates the second cam with its depression 64, the two cams being adjustably connected by screws 66 through elongated arcuate openings 65. This arrangement forms a contact device which is readily adaptable to any clock work or other mechanism and is exceedingly simple and readily adjustable and because of its almost instantaneous "make and break" reduces sparking to a minimum and prolongs the life of the contact points. It also allows adjustment to a very short duration of contact, even though the cams may be moving very slowly. The ends 61 and 60 of arms 54 and 55 may also be narrowed or offset, if desired, as shown in Fig. 8, to allow the positioning of these points in more nearly transverse alinement across face of cam 6, thereby allowing more accurate adjustment and a shorter duration of contact of points 59 where a single cam only is employed.

The sheet 7 is supported near the recording point by plate 67 having arcuate opening 68 to prevent injury to the point of recording stylus 11 in its passage through the sheet.

The solenoids are connected by wires 58 and 74 to suitable binding posts 73, these posts also being connected to the battery 72 and to the "make and break" contact attached to or operated from the mechanism whose service it is desired to record, this being shown for purpose of illustration by the disk 69 carrying pin 70 which comes in contact with member 71.

The operation of the device is readily apparent from the foregoing description. The disk 69 being driven from the mechanism whose record it is desired to obtain and at a speed proportionate to the speed of revolution or frequency of reciprocation of the mechanism will cause pin 70 to come in contact with member 71 with a frequency proportionate to the demand or service of said mechanism. This contact closes the electric circuit through, and energizes solenoid 21, causing depression of its core 22 and consequently of pawl 26, thus producing segmental rotation of ratchet 27 and, through its related gearing, of the drum 20. The cord 18 winding on this drum produces transverse angular movement of indicator arm 12 in proportion to the frequency of contacts of members 70 and 71. The cam 6 revolving at uniform speed as determined by the clock work causes periodic contacts of point 59, thus closing the circuit through, and energizing of solenoid 35, thus depressing the arms 46 and yoke 49, vertically flexing arm 12 and forcing the stylus 11 through the sheet 7. The toggle arms 51 in being depressed gradually separate arms 46 at their extremity, causing vertical release of the yoke 49 and allowing indicator 12 to return to its unflexed position, withdrawing the stylus from the sheet through which it was forced by the depression of arm 12. The continued rotation of shaft 41 by the solenoid 35 and arms 37 and 39 causes the rod 44 to vertically disengage pinion 31 from pinions 29 and 30, the latter of which is loosely mounted on shaft 28, allowing weight 17 to descend by gravity and by so doing to return indicator 12 to its retracted or zero position through instrumentality of cord 15. The continued rotation of cam 6 causes the separation of points 59, breaking the electric circuit and allowing the retraction of the core 36 and consequent dropping and reëngagement of pinion 31 with pinions 29 and 30 when the entire cycle of operation again recommences. The retraction of core 36 may be augmented and the contact relation of pinions 29, 30 and 31 supplemented by a suitable spring 32' if desired.

By means of suitable graduations and markings on the record sheet the various periodic punchings or markings of the stylus may be easily read as to their amounts or demand value and the continuous record of the mechanism to be tested may thus be secured in such manner as to secure the accurate and proper sequence of the varying demand or service conditions, as well as the maximum demand or service during any period of time and the frequency of occurrence and magnitude of such demands. It is understood that the record may be made on any desirable material, it not being essential to the device that paper be used for this purpose.

It is evident the instrument may be designed to give any frequency of records desired, the greater the frequency the greater the accuracy of the record will be. In Fig. 7 is illustrated a hypothetical record, the markings 10A, 11A, 12M and 1P indicating hours of time, the transverse numeral 0 to 100 indicating the service, operation or demand scale. In this illustration the records are made every ten minutes, the demand or service varying from 0 to 92. Each perforation or dot registers accurately the total service, demand or cycles of operation of the mechanism under investigation during the preceding ten minutes. The average of these readings gives the average of such service, and their arrangement on the sheet gives the variation of such service or demand. Any abnormal demand or fluctuation between the periods of recording will be faithfully registered by the relatively higher or lower position of the record or demand scale.

The instrument is of particular adaptation in connection with a watt-hour meter for recording amount, variation and the maximum demand of any electric installation, since in such meter the rotation of the meter shaft is directly proportional to the electrical demand or energy consumption at each instant of time and a periodic record of the speed and variation of rotation of said shaft gives an absolute record of the amounts, variation and maximum electrical demand of such installation.

Moreover, by decreasing the time duration of record periods below the period of time for which it is desired to obtain the maximum demand, which decrease is readily obtainable with this particular mechanism on account of the nature of the record given, the accuracy can be greatly increased over that of other demand instruments operating in conjunction with watt-hour meters. Referring, as an illustrative case, to Fig. 7, and assuming that the maximum load for a thirty minute period was desired and that this particular record was taken from the revolutions of the shaft of an ordinary watt-hour meter, it is seen that the load is quite uneven. Should the load be recorded only at the beginning and end of the required demand period (every thirty minutes in this case, which is the customary frequency of record of watt-hour demand meters), it is seen that, should the recording time happen to come, say, at 10:15, 10:30 and 10:45 (see Fig. 7), the average maximum load for this period would be only 65 plus 45 divided by 2, equals 55, whereas the actual demand was 65. With my instrument, however, from the nature of the record given it is practical and desirable to make several records during the demand period. Thus referring again to Fig. 7, it is seen that the service record is made every ten minutes. By taking the three highest consecutive readings, the thirty minute maximum load may be had with practically no error no matter how irregular the load passing through the watt-hour meter may be. The greater the frequency of the record, the smaller any error of reading will become, and with my instrument these record periods may be as small as circumstances may dictate, without injury to the instrument.

It will thus be seen that I have provided an instrument of extreme accuracy, simplicity, fewness of parts, economy of manufacture, convenience, definiteness and permanence of record, ease and utility of application and of superiority over other instruments of this class.

It is apparent that disk 69 may be applied to any suitable shaft or other revolving or oscillating member of any watt-hour meter or other mechanism, and that its periodic revolutions or oscillations will cause periodic energization of solenoid 21, and, through its allied mechanism, will cause the arcuate advancement of stylus 11 over the record sheet 7 in proportion to the frequency of said revolutions or oscillations. The uniform rotation of the clock-work will cause uniform advancement of said record sheet and a periodic closing of contact points 59, causing periodic energization of solenoid 35, which depresses stylus through said record sheet and causes simultaneous release of stylus so the weight may immediately return it to a zero position. When desired the record sheet may be removed from the instrument and by means of the graduations thereon the amounts or values of the series of perforations may be integrated and, either directly or by multiplying the readings by a predetermined constant, the amount of service rendered by or the demand on the mechanism to be tested may be definitely determined for any desired period or periods of time.

It is understood also that I do not wish to confine myself or the scope of this patent to the definite form or arrangement of parts herein indicated, but I claim such latitude as shall reasonably come within the scope and spirit of this invention and of the appended claims.

What I claim as new and desire to secure by Letters Patent of the United States is:

1. A demand, service or operation recording mechanism comprising in combination a clock work, a graduated record sheet, and means for recording on said sheet by perforations or prick points the maximum demand or service during each of successive predetermined periods of time by means of an arcuately moving stylus advanced from an initial or zero position by means of a flexible element winding by successive increments on an intermittently moving drum actuated by said mechanism to be tested, and means for releasing and returning said recording mechanism to its initial position after making such record.

2. A service, operation or demand recording mechanism comprising in combination a clock work, a record sheet, an arcuately moving stylus traversing said sheet, a flexible element or cord for advancing said stylus, a ratchet operated drum for advancing said cord, a solenoid or magnet for operating said ratchet, a second solenoid or magnet for depressing said stylus, means for releasing said drum, a second flexible element attached to said stylus arm and a gravitatively operated member attached to said flexible element for returning said stylus to its initial position.

3. A service, operation or demand recording mechanism comprising in combination a clock work, a record sheet, a stylus or perforating needle traversing said sheet at the extremity of a vertically flexible arcuately moving indicator arm, a solenoid or magnet for advancing said arm, a yoke superimposed on said arm, a second solenoid or magnet for depressing said yoke and causing said stylus to perforate or mark said sheet, an escapement or spring arms to allow vertical release of said indicator arm, toggle arms for spreading or releasing said arms, a counter-weight or spring for returning said arms to an initial position after the stylus record is complete.

4. A service, operation or demand recording mechanism comprising in combination a clock work, a graduated and longitudinally actuated record sheet, a stylus arcuately traversing said sheet for recording on said sheet by perforations or prick points, a pivotally mounted yoke, toggle actuated escapement or spring arms for depressing and releasing said yoke, a rotary shaft connected to said spring arms, and a solenoid for revolving or oscillating said shaft; an arcuate cam or cams attached to and operated by said clock work, a pair of superimposed resilient electric contact arms, a solenoid connected to said arms, a source of electric energy for energizing said solenoids, a ratchet mechanism actuated by one of said solenoids, a pinion mounted on said ratchet, a free pinion connected to a drum, and means for connecting and releasing said pinion, substantially as described.

5. A service, operation or demand recording mechanism comprising in combination a clock work, a plurality of arcuate cams attached adjustably to a shaft of said clock work and adjustable in relation to each other, a plurality of superimposed or adjacent resilient contact arms adjustably supported on said clock work and operable by said cams for closing and opening an electric current circuit, means for securing said arms in adjusted relation, a solenoid or electro-magnet operated by the current through said circuit, a ratchet operated by said solenoid or magnet, gearing connected to said ratchet, means for automatically connecting and disconnecting said gearing, a drum attached to one of said gears for arcuately advancing a recording stylus or point transversely over a record sheet; a second solenoid or electromagnet energized intermittently by said source of electric energy, means controlled by the mechanism to be tested for making and breaking the energizing current through this second solenoid, for depressing said stylus in contact with the record sheet and for releasing said stylus and allowing its return to an initial or zero position.

6. The combination with an electrical watt-hour meter of a demand recording mechanism comprising a clock work, a record sheet driven by said clock work, means for recording by perforations on said record sheet the demand or the electrical load passing through the watt-hour meter as determined by the revolutions of the watt-hour meter disk shaft during each of a sequence of equal periods of time within which the particular demand is desired, said recording mechanism including an arcuately moving stylus, said stylus being advanced by periodic increments by means of a flexible element winding on a ratchet actuated drum, said ratchet being operated by a solenoid or magnet whose energization is controlled by said watt-hour meter shaft, a second solenoid or magnet whose energization is controlled by said clock work, causing the periodic depressions of said stylus through said record sheet and gravity actuated means for returning said stylus to a zero position after said record is completed.

In testimony whereof I have signed my name to this specification in the presence of two subscribing witnesses.

EMMET GRATTAN RALSTON.

Witnesses:
CHAS. L. HUGHES,
THOS. P. RAPSON.

Copies of this patent may be obtained for five cents each, by addressing the "Commissioner of Patents, Washington, D. C."